United States Patent
Eizenberg et al.

(10) Patent No.: US 8,284,446 B2
(45) Date of Patent: Oct. 9, 2012

(54) METHOD, DEVICE AND COMPUTER READABLE MEDIUM FOR REDUCING CONSUMABLE INK IN RESPONSE TO IMAGE QUALITY DEGRADATION SUCH SMEAR

(75) Inventors: Ori Eizenberg, Tel-Aviv (IL); Yishai Brafman, Tel-Aviv (IL); Boaz Katz, Kfar-Saba (IL); Raphael Salamon, Tel-Aviv (IL)

(73) Assignee: Pretone Ltd., Tel-Aviv (IL)

( * ) Notice: Subject to any disclaimer, the term of this patent is extended or adjusted under 35 U.S.C. 154(b) by 962 days.

(21) Appl. No.: 11/816,632

(22) PCT Filed: Feb. 28, 2006

(86) PCT No.: PCT/IL2006/000267
§ 371 (c)(1),
(2), (4) Date: Aug. 19, 2007

(87) PCT Pub. No.: WO2006/095333
PCT Pub. Date: Sep. 14, 2006

(65) Prior Publication Data
US 2010/0128289 A1    May 27, 2010

(30) Foreign Application Priority Data
Mar. 6, 2005 (IL) .......................................... 167257

(51) Int. Cl.
*G06F 15/00* (2006.01)
*B41J 2/205* (2006.01)

(52) U.S. Cl. ............ 358/1.9; 358/2.1; 358/1.1; 358/1.6; 358/3.1; 358/1.14; 358/1.15; 358/1.18; 358/501; 358/502; 358/504; 358/434; 358/448; 358/449; 347/4; 347/6; 347/7; 347/9; 347/14; 347/15; 347/19; 347/43; 347/85; 347/95; 347/98; 347/100; 347/102; 347/129; 347/140; 347/192; 347/208; 347/214; 382/103; 382/112; 382/255; 382/299

(58) Field of Classification Search .................. 358/2.1, 358/1.1, 1.9, 1.6, 3.1, 1.14, 1.15, 1.18, 501, 358/502, 504, 434, 448, 449; 382/112, 255, 382/299; 347/4, 6, 7, 14, 85, 86, 95, 98, 347/100, 102, 192, 208, 214
See application file for complete search history.

(56) References Cited

U.S. PATENT DOCUMENTS

| | | | | |
|---|---|---|---|---|
| 5,739,828 A * | 4/1998 | Moriyama et al. | ................ | 347/9 |
| 6,015,201 A * | 1/2000 | Asakura | .......................... | 347/19 |
| 6,198,491 B1 * | 3/2001 | Honda | .......................... | 347/129 |
| 6,416,150 B1 | 7/2002 | Kimura | | |
| 6,585,340 B1 | 7/2003 | Borrell | | |
| 7,292,356 B2 * | 11/2007 | Otokita | ........................ | 358/1.13 |
| 7,699,423 B2 * | 4/2010 | Suwa et al. | ..................... | 347/15 |
| 2002/0070990 A1 | 6/2002 | Yamasaki et al. | | |

* cited by examiner

Primary Examiner — Steven Kau
(74) Attorney, Agent, or Firm — Reches Patents

(57) ABSTRACT

Consumable reduction is achieved for a printing device by utilizing a processor (32), memory (34) and software for receiving input information representative of an image to be printed and generating output information representative of a reduced consumable image in response to consumable smear, spatial relationship between adjacent dots and an image quality degradation. Factors such as print medium characteristics, heat or humidity and composure of the consumable are considered in performing the consumable reduction.

27 Claims, 4 Drawing Sheets

```
    determining multiple consumable reduction
  parameters such as consumable smear the spatial
     relationship between adjacent dots and image
                        quality
                         210
```

```
    selectively approving printing of an image in
         response to predefined control rules
                         220
```

```
   receiving input information representative of an
                  image to be printed
                         230
```

```
  generating output information representative of a
  reduced consumable image in response to consumabl
   smear, spatial relationship between adjacent dots
            and an image quality degradation
                         240
```

```
 printing the reduced consumable image by a printe
              that uses a consumable
                         250
```

METHOD, DEVICE AND COMPUTER READABLE MEDIUM FOR REDUCING CONSUMABLE INK IN RESPONSE TO IMAGE QUALITY DEGRADATION SUCH SMEAR

FIELD OF THE INVENTION

This invention relates to methods, systems and computer readable mediums for reducing consumables such as ink or toner.

BACKGROUND OF THE INVENTION

Color printers as well as black and white printers use various consumables such as ink or toner to print text, images and the like. Each image is represented by a two dimensional array of pixels. Each pixel is printed by multiple circular shaped dots (or spots).

A color pixel can be represented in various manners. In the RGB space a pixel is represented by red green and blue components. In the CMY space a pixel is represented by cyan, magenta and yellow components. A CMYK pixel also includes a black component and a CMYKcm pixel also includes a light magenta component.

In an HLS space each pixel has a hue component, a luminance component and a saturation component. The hue represents the color of the pixel, the luminance represents the brightness of the pixel and the saturation represents the color intensity. Inter-space conversions from one color space to another are known in the art.

The cost of ink and toners is relatively high, and in many cases the cost of few consumable cartridges equals the cost of a printer. In order to reduce the cost of printing various ink consumption methods were suggested. A first method includes reducing the ink consumption as well as the printing quality by reducing the amount dots per pixel. Another method involved converting black regions in an image to gray regions. Yet a further method includes reducing dots at random. An additional method involved halftoning. Some prior art methods for ink reduction are described in PCT patent application publication number WO03/049021 titled "Lowering the consumption of ink in computer printing" and in U.S. Pat. No. 5,872,896 of Li et al., titled "Continuous-tone ink reduction". The patent and patent application are incorporated herein by reference.

There is a growing need to reduce consumable consumption.

SUMMARY OF THE INVENTION

The invention provides a method, device and computer readable medium for reducing a consumable consumption.

The invention provides a device that includes: (i) a memory unit, for storing a consumable reduction software; and (ii) a processor, connected the memory; wherein the processor is adapted to receive input information representative of an image to be printed; and to execute the consumable reduction software such as to generate output information representative of a reduced consumable image in response to consumable smear, spatial relationship between adjacent dots and an image quality degradation level.

The invention provides a computer readable medium having stored thereon a set of instructions, the set of instructions, when executed by a processor, cause the processor the perform a method of: receiving input information representative of an image to be printed; and generating output information representative of a reduced consumable image in response to consumable smear, spatial relationship between adjacent dots and an image quality degradation.

The invention provides a method for reducing a consumable, the method includes: receiving input information representative of an image to be printed; and generating output information representative of a reduced consumable image in response to consumable smear, spatial relationship between adjacent dots and an image quality degradation.

Conveniently, the consumable smear is determined in response to a printable medium characteristic and in response to the composure of the consumable. Conveniently, the consumable smear is determined in response to the heat or humidity of the printer. Conveniently, the consumable smear is determined in response to at least one color value associated with adjacent dots.

Conveniently, the method further includes receiving information representative of an image quality degradation level, in response to the printers technology, the printer driver language and to predefined control rules.

Conveniently, the printable medium characteristic is the printable medium absorption capability. The printable medium can be paper but this is not necessarily so.

Conveniently, the method includes selectively approving printing the reduced consumable image in response to predefined control rules.

Conveniently, the method further includes printing the reduced consumable image by a printer that uses a consumable.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 4 is a flow chart of a method for consumable reduction, according to an embodiment of the invention.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

For convenience of explanation the following detailed description relates to ink and to ink printers. It is noted that the invention can be applied to other consumables or printers, such as but not limited to toners and laser printers.

Figure 2:
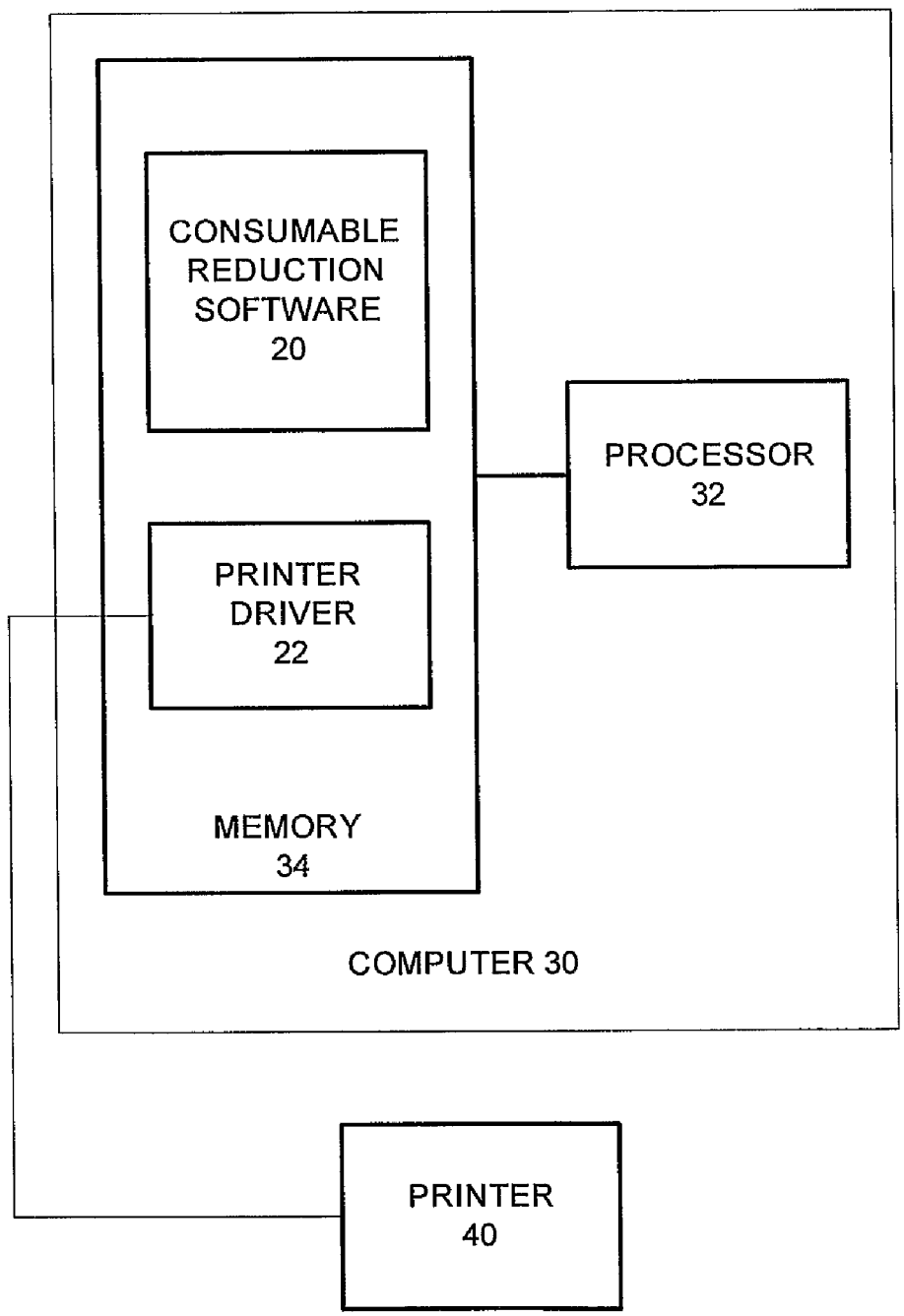
FIG. 2 illustrates a computer and a printer, as well as multiple software components, according to an embodiment of the invention.
Figure 3:
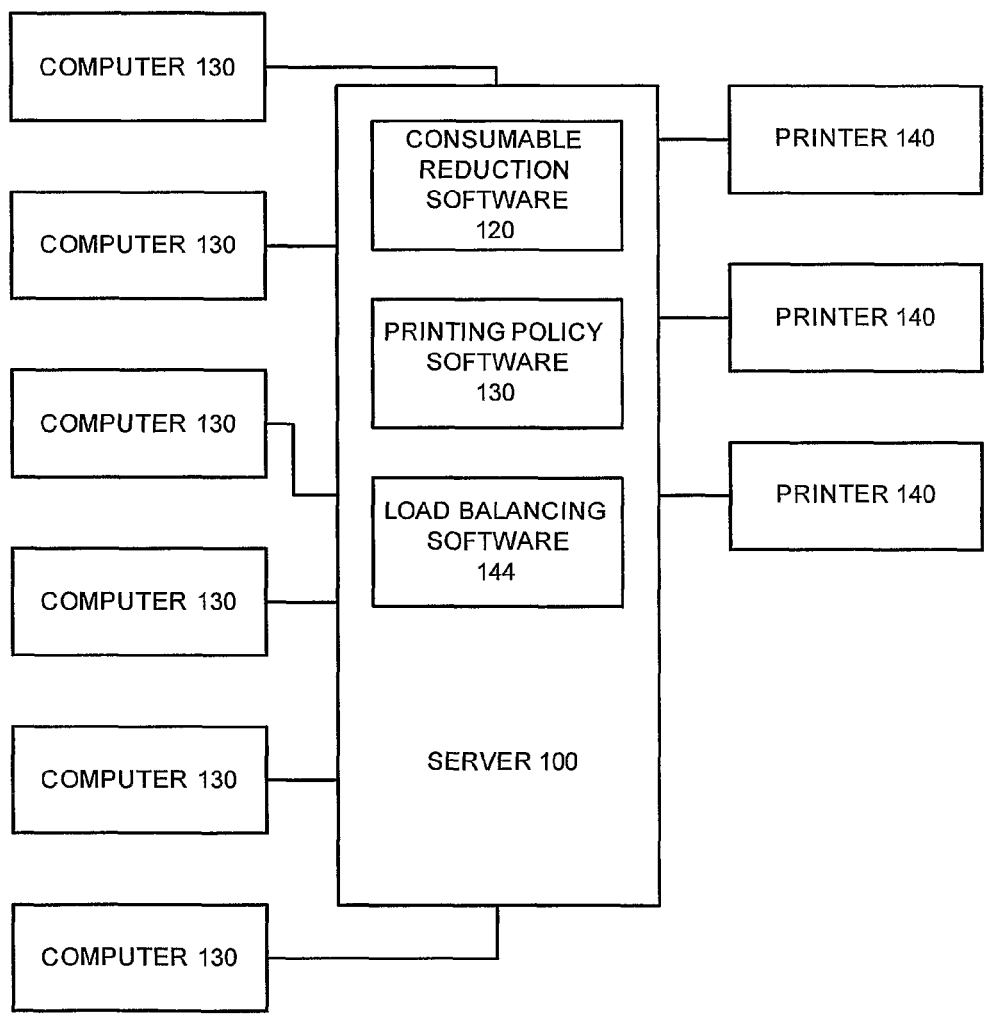
FIG. 3 illustrates a server, multiple computers and printers, according to another embodiment of the invention.

It is further noted that although FIGS. 2 and 3 illustrate a computer that the invention can be applied in various devices such as mobile devices, digital cameras, cellular phones, personal data accessories and the like.

The term "image" includes text, graphics, pictures, or a combination of two or more of them.

Figure 1:
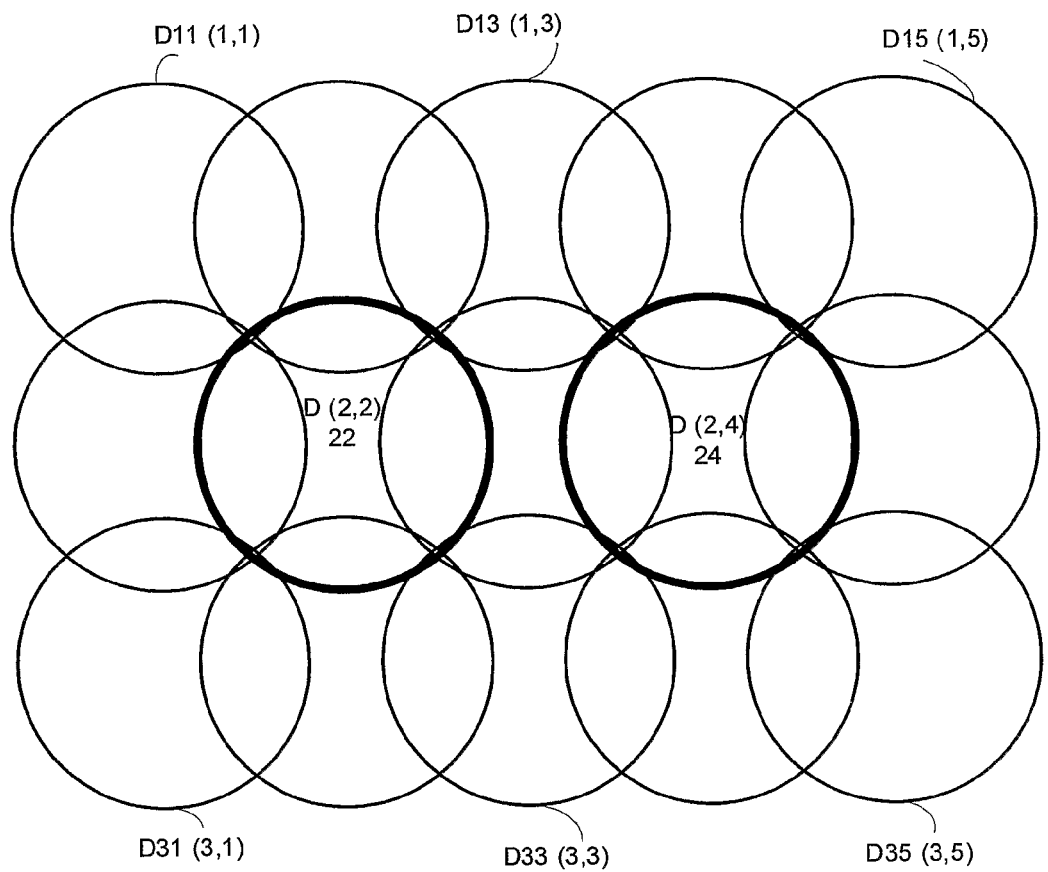
FIG. 1 illustrates the spatial relationship between adjacent dots.

FIG. 1 illustrates the spatial relationship between a group of adjacent dots denoted D(1,1)-D(3,5) 11-35. Each dot is circular and in order to cover a rectangular area they overlap.

Dots D(2,2) 22 and D(2,4) 24 are surrounded by four dots each almost entirely overlap with these adjacent dots.

The inventors found out that when such a dot is omitted only a very small dot portion is theoretically remained uncovered. When the dot is removed the corresponding dot portion can be substantially covered due to the smearing or bleeding effect.

According to an embodiment of the invention a dot can be removed if the smearing effect causes the corresponding dot portion to be filled without exceeding a predefined quality degradation level.

The smearing effect is responsive to various parameters. For example, the inventors found that larger smear can take place when using a printable medium having a high ink absorption capabilities, by using soluble dye-based ink, by using a smooth printable medium, or by using a consumable with large xerographic particles (for example—high diameter carbon molecules), and the like.

According to an embodiment of the invention the dot removal is responsive to the properties of the image. For example—edges or areas that are near edges will not be subjected to dot removal or will be subjected to a lower level of dot removal.

FIG. 2 illustrates a computer and a printer, as well as multiple software components, according to an embodiment of the invention.

Computer 30 includes software and hardware components such as a display, a keypad, a mouse (not shown), a processor 32, one or more memory module 34, a motherboard and an printer output interface 12. The computer 30, and especially processor 32, are adapted to execute various software modules such as an operating system, word processors, graphic software, consumable reduction software 20 and a printer driver 22. The printer driver 22 is capable of receiving images, such as consumable reduced images, to be printed by printer 40 and convert the image to printer instructions that are executed by the printer 40.

The consumable reduction software 20 is adapted to convert an image to a consumable reduced image. The consumable reduced image can be printed with less consumable than the image. The consumable reduced image substantially equals the image. The quality differences by the image and the consumable reduced image can be determined by a user. Conveniently, the quality is reduced without substantially affecting the quality of the reduced consumable image as perceived by a viewer.

The consumable reduction software 20 is adapted to receive or calculate various consumable reduction parameters that affect the conversion or to select default values of these parameters.

According to an embodiment of the invention at least one consumable reduction parameter is received from a user. The reception can be triggered by asking the user (by utilizing visual and/or audio means) to input one or more consumable reduction parameters.

According to yet another embodiment of the invention at least one consumable reduction parameter is provided by the printer driver or by the printer itself.

According to an embodiment of the invention the image quality degradation can determine which portions of the image to process, but can also determine how the consumable is reduced. For example, a certain quality level can determine the amount of image lines, rows or pixel groups that are processed, while other lines, rows or pixel groups are left unchanged. Yet for another example, the determination of whether to skip a certain dot or to subject edges to processing, can be responsive to the required quality level.

According to an embodiment of the invention a user can define various image quality degradation levels. The image quality degradation level can be associated to each component of a pixel.

For example, a pixels can be skipped if the luminance value does not reach a minimal color intensity threshold.

According to yet another embodiment of the invention the image quality degradation levels can be provided by the printer and/or printer driver characteristics.

For example, a certain quality level can be determined by the printer driver language or the printer model.

The inventors used the HLS representation, although this is not necessarily so. The HLS space is very easy to understand. The usage of the HLS representation allows the user to control the quality degradation in a more intuitive manner. Thus, the user can requested to select how to reduce the brightness of an image, the color or the intensity of the image.

If for example, a dot is removed in response to a quality degradation value (or tolerance value) a then each of the three components (hue, luminance and saturation) can be associated with a different quality degradation value such as $\alpha_H$, $\alpha_L$, and $\alpha_S$.

Conveniently, the consumable reduction software 20 performs the consumable reduction processing in the HLS space. Thus, if the input image is represented by another color space the consumable reduction software performs an inter-color space conversion. The consumable reduction software can also convert the consumable reduced image to a color space that is compatible with the printer driver.

According to yet another embodiment of the invention the color reduction stage is performed by the printer driver. In such a case the set of instructions that should print an image can be converted to a set of instructions that should print a reduced consumable image.

FIG. 3 illustrates a server, multiple computers and printers, according to another embodiment of the invention.

Server 100 is connected to multiple computers 130 and to multiple printers 140. The printers can differ from each other by their printing parameters (black and white or color, printing quality, maximal dots per inch, speed, paper size and type, and the like).

The server includes consumable reduction software 120 and can optionally include printing policy software 130 and an optional load balancing software 144.

The server receives requests from various computers 130 to print an image and determine whether to allow a certain computer to print a certain image, which printer shall print the image and which consumable reduction policy to apply. It is noted that the printing policy software can installed on a single computer.

It is further noted that the ink reduction software can be installed in other environments, such as remote access environment in which the printer and user are located in distant places.

FIG. 4 is a flow chart of a method 200 for consumable reduction, according to an embodiment of the invention.

Method 200 starts by stage 210 of determining multiple consumable reduction parameters. These parameters include consumable smear, the spatial relationship between adjacent dots and image quality degradation level.

Conveniently, the consumable smear is determined in response to at least one of the following: (i) a printable medium characteristic, (ii) a composure of the consumable, (iii) the heat and/or humidity of the printer, or (iv) at one color value associated with adjacent dots. Conveniently, the printable medium characteristic is the printable medium absorption capability. It is noted that the first three elements can be calculated in advance and can be applied to whole image. The three elements can be calculated or estimated off line.

It is noted that the smear factor can be estimated by printing a test pattern. The test structure can be evaluated, either by the user, or be scanned and automatically processed by a computer. Conveniently, the test pattern will include fine lines that are located in close proximity to each other.

Each element out of elements (i)-(iii) can be either estimated, measured, calculated or inputted by a user. For example, the printable medium characteristic can be provided by a user.

The printable medium characteristic can also be provided by a local or remote database if the type of printable medium is provided. In many cases the quality of some printable mediums can be accessed by the printer driver. The composure of the consumable can be inputted by the user or can be known to the printer driver. For example, if a user uses an original consumable provided by a known vendor, the properties of said consumable can be known to the printer or can be downloaded from a database such as a web based database.

The heat or humidity of the printer can be measured by heat and humidity sensors but can also estimated in response to printing sequences that are executed by the printer. It is known that the temperature rises when a printer performs a long printing session.

Stage 210 is followed by stage 230 of receiving input information representative of an image to be printed.

Stage 230 is followed by stage 240 of generating output information representative of a reduced consumable image in response to consumable smear, spatial relationship between adjacent dots and an image quality degradation level (or levels).

According to an embodiment of the invention stage 240 includes comparing a quality degradation value (or tolerance value) a to a smear factor β multiplied by the difference between color values of adjacent dots and/or comparing the color value luminance with a pre defined threshold λ.

In the following equation the dot that is being evaluated is referred to the element, the four adjacent dots are referred to as up, down right and left dots, and L is the luminance component. In mathematical terms a dot is removed only if the two equations are fulfilled, assuming that each dot is represented by a color vector, then the equation has the following form:

$$Lelement > \lambda$$

$$\left| \vec{C}element - \frac{\vec{C}up + \vec{C}down + \vec{C}right + \vec{C}left}{4} \right| * \alpha \geq \beta$$

If a dot is represented by a single color component (for example—a black and white dot) or if it is represented by multiple separate color components than a scalar version of the mentioned above equation is implemented.

Various decision rules can then be applied in response to the results of the multiple scalar equations. Conveniently, only if all the equations indicate that a dot can be removed without exceeding the tolerance value then the dot is removed.

In mathematical terms, a dot is removed only if the four equations are fulfilled (for a HLS representation), wherein H is the hue component and is associated with $\alpha_H$ and $\beta_H$, S is the saturation component and is associated with $\alpha_S$ and $\beta_S$, and L is the luminance component which is associated with $\alpha_L$ and $\beta_L$.

$$Lelement > \lambda$$

$$\left| Helement - \frac{Hup + Hdown + Hright + Hleft}{4} \right| * \alpha_H \geq \beta_H$$

$$\left| Selement - \frac{Sup + Sdown + Sright + Sleft}{4} \right| * \alpha_S \geq \beta_S$$

$$\left| Lelement - \frac{Lup + Ldown + Lright + Lleft}{4} \right| * \alpha_L \geq \beta_L$$

According to an aspect of the invention the method can be performed by executing a set of instructions that can be executed by a processor. The set of instructions can be stored in various memory modules, diskettes, disks, CD-ROMS, DVD and the like.

According to another embodiment of the invention method 200 includes stage 220 of selectively approving printing of an image in response to predefined control rules.

It is noted that stage 240 of generating a reduced consumable image can be executed off-line as well as in real time. Accordingly, the reduced consumable image can be stored and later be printed.

Stage 240 is followed by stage 250 of printing the reduced consumable image by a printer that uses a consumable.

The present invention can be practiced by employing conventional tools, methodology and components. Accordingly, the details of such tools, component and methodology are not set forth herein in detail. In the previous descriptions, numerous specific details are set forth, such as shapes of test structures and materials that are electro-optically active, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A method for reducing a consumable by a printer driver on a computer, the method comprising: receiving input information representative of an image to be printed; and generating output information representative of a reduced consumable image in response to consumable smear, spatial relationship between adjacent dots and an image quality degradation; wherein the reduced consumable image has fewer pixels than the image to be printed; and removing a certain dot from an image to be printed if: (i) a luminance value of the certain dot exceeds a predefined threshold; and (ii) a smear factor does not exceed a quality degradation value multiplied by a difference between a color vector of the certain dot and an average of color vectors of adjacent dots of the certain dot.

2. The method according to claim 1 wherein the consumable smear is determined by (i) printing a test pattern, (ii) evaluating the reduced consumable image of the test pattern, wherein the test pattern is scanned and automatically processed by a computer.

3. The method according to claim 1 wherein the consumable smear is determined in response to a heat or a humidity of the printer.

4. The method according to claim 1 further comprising removing a certain dot from the image to be printed if: (i) a color value of the certain dot exceeds a predefined threshold; and (ii) for each of a hue color component, a saturation color component and luminance color component a smear factor of the color component does not exceed a quality degradation value of the color component multiplied by a difference between the color component value of the certain dot and an average color component value of adjacent dots of the certain dot.

5. The method according to claim 1 further comprising detecting of single-color dots and receiving information representative of an image quality degradation removing a certain dot from the image to be printed if: (i) a color value of the certain dot exceeds a predefined threshold; and (ii) a smear factor does not exceed a quality degradation value multiplied by a difference between the color value of the certain dot and an average color value of adjacent dots of the certain dot.

6. The method according to claim 1 wherein the printable medium characteristic is the printable medium absorption capability.

7. The method according to claim 1 wherein at least one of (a) edges, (b) areas that are near edges and (c) areas selectively approved in response to predefined rules, are subjected to a lower level of dot removal.

8. The method according to claim 1 further comprising printing the reduced consumable image by a printer that uses a consumable.

9. The method according to claim 1, comprising utilizing consumable smear for removing certain dots in the neighborhood of the consumable smear from the image to be printed.

10. A non-transitory computer readable medium having stored thereon a set of instructions, the set of instructions, when executed by a processor, cause the processor the perform a method of: receiving input information representative of an image to be printed; and generating output information representative of a reduced consumable image in response to consumable smear, spatial relationship between adjacent dots and an image quality degradation; wherein the reduced consumable image has fewer pixels than the image to be printed; further storing instructions for removing a certain dot from the image to be printed if: (i) a luminance of the certain dot exceeds a predefined threshold; and (ii) a smear factor does not exceed a quality degradation value multiplied by a difference between the color vector of the certain dot and an average color vector of adjacent dots of the certain dot.

11. The non-transitory computer readable medium according to claim 10 wherein the consumable smear is determined by (i) printing a test pattern, (ii) evaluating the reduced consumable image of the test pattern, wherein the test pattern is scanned and automatically processed by a computer.

12. The non-transitory computer readable medium according to claim 10 wherein the consumable smear is determined in response to at least one of (a) a heat or a humidity of the printer, (b) at least one color value associated with adjacent dots (c) a printable medium characteristic, and (d) a composure of the consumable.

13. The non-transitory computer readable medium according to claim 10 further storing instructions for removing a certain dot from the image to be printed if: (i) a color value of the certain dot exceeds a predefined threshold; and (ii) for each of a hue color component, a saturation color component and luminance color component a smear factor of the color component does not exceed a quality degradation value of the color component multiplied by a difference between the color component value of the certain dot and an average color component value of adjacent dots of the certain dot.

14. The non-transitory computer readable medium according to claim 10 further storing instructions for detection of single-color dots and removing a certain dot from the image to be printed if: (i) a color value of the certain dot exceeds a predefined threshold; and (ii) a smear factor does not exceed a quality degradation value multiplied by a difference between the color value of the certain dot and an average color value of adjacent dots of the certain dot.

15. The non-transitory computer readable medium according to claim 10 wherein the printable medium characteristic is the printable medium absorption capability.

16. The non-transitory computer readable medium according to claim 10 wherein at least one of (a) edges, (b) areas that are near edges and (c) areas selectively approved in response to predefined rules, are subjected to a lower level of dot removal.

17. The non-transitory computer readable medium according to claim 10 further comprising printing the reduced consumable image by a printer that uses a consumable.

18. The non-transitory computer readable medium according to claim 10 comprising utilizing consumable smear for removing certain dots in the neighborhood of the consumable smear from the image to be printed.

19. A device comprising: a computer further comprising a memory unit, for storing an consumable reduction software; and a processor, coupled to the memory; a printer driver software; wherein the printer driver on the computer is adapted to receive input information representative of an image to be printed; and to execute the consumable reduction software such as to generate output information representative of a reduced consumable image in response to consumable smear, spatial relationship between adjacent dots and an image quality degradation; wherein the reduced consumable image has fewer pixels than the image to be printed; wherein the printer driver software is further adapted to remove a certain dot from the image to be printed if: (i) a luminance of the certain dot exceeds a predefined threshold; and (ii) a smear factor does not exceed a quality degradation value multiplied by a difference between the color vector of the certain dot and an average color vector of adjacent dots of the certain dot.

20. The device according to claim 19 wherein the processor determines consumable smear by (i) printing a test pattern, (ii) evaluating the reduced consumable image of the test pattern, wherein the test pattern is scanned and automatically processed by a computer.

21. The device according to claim 19 wherein the processor determines the consumable smear in response to at least one of a heat or a humidity of the printer.

22. The device according to claim 19 further adapted to remove a certain dot from the image to be printed if: (i) a color value of the certain dot exceeds a predefined threshold; and (ii) for each of a hue color component, a saturation color component and luminance color component a smear factor of the color component does not exceed a quality degradation value of the color component multiplied by a difference between the color component value of the certain dot and an average color component value of adjacent dots of the certain dot.

23. The device according to claim 19 further adapted to detecting single-color dots and remove a certain dot from the image to be printed if: (i) a color value of the certain dot exceeds a predefined threshold; and (ii) a smear factor does not exceed a quality degradation value multiplied by a difference between the color value of the certain dot and an average color value of adjacent dots of the certain dot.

24. The device according to claim 19 wherein the printable medium characteristic is the printable medium absorption capability.

25. The device according to claim 19 wherein the processor selectively approves printing of an image in response to predefined control rules.

26. The device according to claim 19 further comprising a printer that prints the reduced consumable image by using a consumable.

27. The device according to claim 19 further adapted to utilizing consumable smear for removing certain dots in the neighborhood of the consumable smear from the image to be printed.

* * * * *